United States Patent
Simmons et al.

(10) Patent No.: US 8,900,486 B2
(45) Date of Patent: Dec. 2, 2014

(54) CONDUCTIVITY OF RESIN MATERIALS AND COMPOSITE MATERIALS

(75) Inventors: Martin Simmons, Baldock (GB); John Cawse, West Wratting (GB)

(73) Assignee: Hexcel Composites Limited, Duxford (GB)

( * ) Notice: Subject to any disclaimer, the term of this patent is extended or adjusted under 35 U.S.C. 154(b) by 851 days.

(21) Appl. No.: 12/996,025

(22) PCT Filed: Jun. 5, 2009

(86) PCT No.: PCT/GB2009/001437
§ 371 (c)(1),
(2), (4) Date: Jan. 28, 2011

(87) PCT Pub. No.: WO2009/147415
PCT Pub. Date: Dec. 10, 2009

(65) Prior Publication Data
US 2011/0163275 A1 Jul. 7, 2011

(30) Foreign Application Priority Data
Jun. 7, 2008 (GB) .................................. 0810453.1

(51) Int. Cl.
*H01B 1/24* (2006.01)
*C08K 7/24* (2006.01)
*C08K 7/06* (2006.01)
*C08G 59/50* (2006.01)
*C08L 53/00* (2006.01)

(52) U.S. Cl.
CPC .. *H01B 1/24* (2013.01); *C08K 7/24* (2013.01); *C08L 53/00* (2013.01); *C08K 7/06* (2013.01); *C08G 59/5033* (2013.01)
USPC ...... 252/511; 252/502; 428/297.4; 428/299.1

(58) Field of Classification Search
USPC ..................... 252/502, 511; 428/297.4, 299.1
See application file for complete search history.

(56) References Cited

U.S. PATENT DOCUMENTS 5,250,228 A * 10/1993 Baigrie et al. ................ 252/511
5,476,908 A * 12/1995 Kishi et al. .................... 525/393

(Continued)

FOREIGN PATENT DOCUMENTS

| EP | 2053078 A1 | 4/2009 |
| WO | 99/30329 | 6/1999 |
| WO | 2007/011313 | 1/2007 |

OTHER PUBLICATIONS

Studies on the phase separation of polyetherimide-modified epoxy resin, Cui et al, Macromol. Chem. Phys. 199, 1998, 1645-1649.*

(Continued)

*Primary Examiner* — Mark Kopec
*Assistant Examiner* — Haidung Nguyen
(74) *Attorney, Agent, or Firm* — W. Mark Bielawski; David J. Oldenkamp

(57) ABSTRACT

A resin material is provided which comprises at least one thermoset resin, carbon conductive additive material, and at least one thermoplastic polymer resin. The thermoplastic polymer resin dissolves in the thermoset polymer resin and phase separates upon cure. There is also provided a method of making the resin material, and additionally a composite material that comprising said resin material in combination with a fibrous reinforcement. The resin material and composite material may each be used in an uncured or cured form, and may find particular use as a prepreg material.

16 Claims, 2 Drawing Sheets

(56) References Cited

U.S. PATENT DOCUMENTS

| | | | |
|---|---|---|---|
| 6,783,828 B2* | 8/2004 | Fujimaru et al. | 428/40.1 |
| 6,878,776 B1* | 4/2005 | Pascault et al. | 525/113 |
| 7,931,958 B2* | 4/2011 | Arai et al. | 428/297.4 |
| 2002/0007022 A1* | 1/2002 | Oosedo et al. | 525/527 |
| 2009/0121196 A1* | 5/2009 | El Bounia | 252/511 |
| 2010/0130646 A1* | 5/2010 | Park et al. | 523/440 |
| 2013/0022780 A1* | 1/2013 | Kawazoe et al. | 428/116 |

OTHER PUBLICATIONS

Technical Note-Sumikaexcel PES, Sumitomo Chemical, pp. 1-35, Sep. 2010.

* cited by examiner

CONDUCTIVITY OF RESIN MATERIALS AND COMPOSITE MATERIALS

The present invention relates to resins and composite materials, and particularly, but not exclusively to, electrically conductive resins and composite materials.

Resins and composite materials comprising resins are increasingly used in structural applications in many fields owing to their attractive mechanical properties and low weight in comparison to metals. However, whilst electrical conductivity is one of the most obvious attributes of metals, resins and composite materials based on fibre reinforcements (such as adhesive films, surfacing films, and pre-impregnated (prepreg) materials) generally have much lower electrical conductivity.

The property of electrical conductivity can be improved by adding many different kinds of conductive particles. Metal particles are used to improve electrical conductivity of resins, but large weight fractions of greater than 50 wt. % are typically required. This addition of metal particles can therefore increase the density and weight of the resin, and also lead to a decline in the mechanical performance of the resin.

Alternative conductive particles such as polypyrrole or polyaniline can be added to resins to achieve improved electrically conductivity. Much reduced levels of these particles are required in comparison to metal particles, but the resulting electrical conductivity is still lower than using metal particles. In addition, mechanical and thermal properties can be degraded even with lower weight fractions of around 5-15 wt. % of these conductive particles.

Carbon based conductive particles, such as carbon black, are also used to increase electrical conductivity of resins. Typical loadings can be from 2 to 40 wt. % depending on the application. Carbon black is extensively used due to its low cost, availability, and ease of use. However, problems using this material include large increases in viscosity resulting in resins that are difficult to process, and also a reduction in mechanical properties of the resin.

Further alternative additives are carbon nanotubes (CNTs) and carbon nanofibres (CNFs). These are based on cylinders of graphite sheets and can, in theory, provide conductance in resins comparable to metals particles. Much of the published data has shown that addition of very low loadings (less than 0.5 wt. %) of CNTs can improve the electrical conductivity of resins. CNFs have also been shown to improve electrical conductivity of resins at low loadings of as 1 wt. %.

The main problem encountered with CNTs and CNFs is how to ensure even dispersal in resins which has been difficult to achieve due to the strong forces (van der Waals forces) causing agglomeration of the CNTs and CNFs. This poor dispersion leads to an overall reduction in the conductivity of the resin with formation of areas of poor conductance. Various methods have been used to overcome these forces such as extruding, high shear mixing and sonication. However, dispersion typically remains poor. Furthermore, an uncontrolled re-agglomeration of the dispersed CNTs and CNFs can occur when the mixing is stopped and during cure of the resin. In addition some of these dispersion techniques cause damage to the CNFs and CNTs therefore reducing electrical conductivity.

The present invention therefore seeks to provide a resin which has improved electrical conductivity and mechanical properties, and which overcomes the disadvantages of prior attempts as described herein. The present invention further seeks to provide a method of making the resin having improved electrical conductivity and mechanical properties.

The present invention also seeks to provide a composite material or cured composite material which comprises the resin material, and which has improved electrical conductivity and mechanical properties.

According to a first aspect of the present invention there is provided a resin material comprising;
   at least one thermoset polymer resin;
   carbon conductive additive material; and
   at least one thermoplastic polymer resin that dissolves in the thermoset polymer resin and phase separates upon cure.

According to a second aspect of the present invention there is provided a method of making a resin material comprising mixing:
   at least one thermoset polymer resin;
   carbon conductive additive material; and
   at least one thermoplastic polymer resin that dissolves in the thermoset polymer resin and phase separates upon cure.

According to a third aspect of the present invention there is provided a composite material, said composite material comprising at least one resin material according to the first aspect, and at least one fibrous reinforcement.

Surprisingly, it has been found that the addition of a thermoplastic polymer resin that dissolves in thermoset polymer resin and phase separates upon cure, along with carbon conductive additive material, results in lower surface electrical resistivity than a composition that contains no such thermoplastic polymer.

The reduction in resistivity and improvement in conductivity achieved by the present invention is surprising as thermoplastic material is typically thought of as being an electrically insulating material, and therefore addition of this would typically be thought to have the effect of increasing resistivity and lower electrical conductivity.

The present invention provides a resin material having good electrical conductance with improved dispersion and with less post mix agglomeration of the carbon conductive particles. The present invention also provides a resin material having a low viscosity on addition of the carbon conductive materials in order to provide easier processability. Additionally the resin material has mechanical and thermal properties which are unaffected and even improved.

It is envisaged that the terms "resistivity" and "conductivity" used herein refer to electrical resistivity and electrical conductivity.

Bulk resistivity refers to the measurement of the "bulk" or "volume" electrical resistivity of a semi-conductive or conductive resin material. The value of bulk resistivity is the inherent resistance of a given material with relation to its volume. The values are usually measured and expressed in units of ohm meters ($\Omega$m) for the conductivity of a three dimensional material. The bulk electrical resistivity $\rho_V$ of a material is usually defined by the following:

$$\rho v = \frac{RA}{t}$$

where:
   $\rho_V$ is the volume/bulk resistivity (measured in ohm meters);
   R is the electrical resistance of a uniform specimen of the material measured between two parallel sides of the adhesive bondline (measured in ohms);

t is the thickness of the adhesive bondline (measured in meters)—and equals the distance between the substrates and the potential electrodes; and A is the overlap area of the joint (measured in square meters).

The surface resistivity is a measure of resistivity of thin films having uniform thickness. Surface resistivity is measured in Ohms/square (or Ω/square), and it is equivalent to resistivity for two-dimensional systems. The term is therefore a measure of resistivity for a current passing along the surface, rather than through the material which is expressed as bulk resistivity. Surface resistivity is also referred to as sheet resistance.

The term 'carbon conductive additive material' includes any suitable material which is formed from carbon, and is substantially insoluble in the resin material. It will be understood that the carbon conductive additive material is formed substantially from carbon.

'Carbon conductive additive material' may refer to a plurality of carbon conductive additives being of the same type. Alternatively, the term may refer to a mixture of a plurality of different types of carbon conductive additives.

The term 'carbon conductive additives' also includes additives which, prior to curing, are in the form of curing powders, atomised particles, fibres, flakes, rods, or any other three-dimensional particles.

The additives may have any suitable shapes including, by way of example, fibrous, spherical, ellipsoidal, spheroidal, discoidal, dendritic, rods, discs, acicular, cuboid or polyhedral.

The carbon conductive additives may have well defined geometries or may be irregular in shape.

Suitable carbon conductive additive materials may be selected from graphite flakes, graphite powders, graphite particles, graphene sheets, carbon nanotubes, carbon nanofibres, fullerenes, or any combination thereof.

Particularly preferred carbon conductive additive materials are carbon nanotubes, carbon nanofibres, or a combination of carbon nanotubes and carbon nanofibres.

The carbon nanofibres or carbon nanotubes may be any suitable carbon nanofibre or nanotube material. The carbon nanofibres or nanontubes may be of any chirality.

The carbon nanotubes may be armchair nanotubes. The nanotubes may be semiconducting nanotubes or any other type that displays electrical conductivity.

The carbon nanofibres and carbon nanotubes may have a diameter in the range 1 nm to 500 nm. The carbon nanofibres and carbon nanotubes may have a length in the range of 0.1 μm to 10 μm.

The carbon nanotubes preferably have a diameter in the range 1 nm to 50 nm and a length in the range of 0.1 μm to 5 μm.

The carbon nanofibres preferably have a diameter in the range of 80 nm to 200 nm, and may have a length in the range of 1 μm to 10 μm. More preferably the carbon nanofibres may have a diameter in the range of 100 nm to 150 nm, and may have a length in the range 1 μm to 5 μm.

The carbon conductive additive materials may be selected from single walled carbon nanotubes (SWNTs), double walled carbon nanotubes (DWNTs), multi walled carbon nanotubes (MWNTs), stacked cup carbon nanofibres, or any combination thereof.

The carbon conductive additive material may be present in the range 0.1 wt. % to 20 wt. % of the resin material. More preferably, the carbon conductive additives may be present in the range 0.5 wt. % to 10 wt. %. Most preferably, the carbon conductive additive material may be present in the range 1 wt. % to 5 wt. %.

The carbon conductive additive material may have an aspect ratio of less than 10,000:1. Preferably, the aspect ratio may be less than 1,000:1.

Preferably, the aspect ratio of the carbon conductive additive material is at least 2:1. More preferably, the aspect ratio is at least 10:1.

The term "aspect ratio" used herein is understood to refer to the ratio of the longest dimension to the shortest dimension of a three dimensional body. The term is applicable to additives of any shape and size as used herein. Where the term is used in relation to spherical or substantially spherical bodies, the relevant ratio would be that of the largest cross sectional diameter with the smallest cross sectional diameter of the spherical body. It will therefore be understood that a perfect sphere would have an aspect ration of 1:1.

The carbon conductive additive material may be used alone or in any suitable combination with other non-carbon conductive additives as discussed herein.

It is envisaged that the resin material or composite material may comprise one type of carbon conducting additive material. Alternatively, the resin material or composite material may comprise any combination of different types of any of the suitable carbon conducting additives as described herein.

The term "polymer", "polymer resin", "polymeric system", and "resin" are used interchangeably in the present application, and are understood to refer to mixtures of resins having varying chain lengths. The term polymer therefore includes embodiments where the resins present are in the form of a resin mixture comprising any of monomers, dimers, trimers, or resins having chain length greater than 3. The resulting polymers, when cured, form a crosslinked resin matrix. References to specific resins throughout the description are to monomer components which would be used to form the resulting resin unless otherwise specified.

The term 'thermoset polymer resin' includes any suitable material which is plastic and usually liquid, powder, or malleable prior to curing and designed to be moulded in to a final form.

The thermoset polymer resin may be any suitable thermoset polymer. Once cured, a thermoset polymer resin is typically not suitable for melting and remolding.

Suitable thermoset polymer resins for the present invention include, but are not limited to, resins of phenol formaldehyde, urea-formaldehyde, 1,3,5-triazine-2,4,6-triamine (Melamine)-formaldehyde, bismaleimide, epoxy resins, isocyanate modified epoxy resins, vinyl ester resins, benzoxazine resins, phenolic resins, unsaturated polyesters, cyanate ester resins, or any combination thereof.

The thermoset polymer resin may preferably be selected from epoxy resins, cyanate ester resins, bismaleimide resins, vinyl ester resins, isocyanate modified epoxy resins, benzoxazine resins, phenolic resins, or any combination thereof.

The thermoset polymer resin may preferably be selected from resins formed by bisphenol-A (BPA) diglycidyl ether and bisphenol-F (BPF) diglycidyl ether and derivatives thereof; tetraglycidyl derivatives of 4,4'-diaminodiphenyl-methane (TGDDM); triglycidyl derivatives of aminophenols; other glycidyl ethers or glycidyl amines well known in the art, or any combination thereof.

Particularly preferred thermoset polymer resins may be formed by bisphenol-A diglycidyl ether and bisphenol-F diglycidyl ether, brominated resins of bisphenol-A diglycidyl ether, glycidyl amines, or any combination thereof.

The thermoset polymer resin may be present in the range 0.5 wt % to 99.4 wt. % of the resin material. More preferably, the thermoset polymer may be present in the range 5 wt. % to 95 wt. %. Most preferably, the thermoset polymer may be present in the range 10 wt. % to 80 wt. %.

The term 'thermoplastic polymer' includes any suitable material which is plastic or deformable, melts to a liquid when heated, and freezes to a glassy state when cooled sufficiently. Once formed, a thermoplastic polymer resin is typically suitable for melting and re-moulding.

The term 'thermoplastic polymer resin that dissolves in the thermoset polymer resin and phase separate upon cure' refers to the thermoplastic polymer which substantially dissolves in at least one of the thermoset polymer resins present in the resin material. It will be understood that said thermoplastic polymer resins also substantially phase separate and therefore undergo self-assembly during cure of the resin material. Said thermoplastic polymers would also form a separate phase to the thermoset polymer resin component in the cured form of the resin material, therefore forming two distinct phases. The use of thermoplastic polymer resin allows for lower amounts of carbon conductive additive material to be present in the resin material whilst still providing reduced resistivity.

The term 'dissolve' as referred to herein is to be understood to refer to the commonly understood chemical process of solvation, and specifically where the thermoplastic polymer resin is solvated in at least one of the thermoset polymer resins present in the resin material. In a solvated state the thermoplastic polymers would be dissolved in the thermoset resin such that said thermoplastic polymers were spread out and surrounded by thermoset polymers.

As a consequence of the phase separation, substantially all the carbon conductive additive material will be present in the non-thermoplastic polymer phase. By 'substantially all' it is meant at least 90 wt. % of the carbon conductive additive material, preferably 95 wt. %, and more preferably 98 wt. %.

The phase separation may comprise formation of domains substantially comprised of thermoplastic polymers and being of a size in the range 20 to 5000 nm when measuring the largest cross-sectional dimension of the domain. Preferably at least 95 wt. % of the thermoplastic polymer resin present in the resin material will be in the form of the phase separated domains. Any thermoplastic polymer resin not present in the phase separated domains would typically be dispersed throughout the remaining resin material.

Suitable phase separating thermoplastic polymer resin for use with the present invention may be selected from homopolymers or copolymers of any of the following, either alone or in combination: polystyrenes, polybutadienes, polyacrylates, polymethacrylates, polyacrylics, polyether sulphone (PES), polyether ethersulphone (PEES), polyphenyl sulphone, polysulphone, polyester, liquid crystal polymers, polyimide, polyetherimide, aramid, polyamide, polyester, polyketone, polyetheretherketone (PEEK), polyurethane, polyarylether, polyarylsulphides, polyphenylene oxide (PPO) and modified PPO, poly(ethylene oxide) (PEO), and poly(propylene oxide).

Copolymers of any of the above polymers may be preferred. Any such copolymers may be formed with any of the thermoplastic polymer components detailed herein.

Copolymers may be of any of the types known in the art such as alternating, periodic, random, graft, or block. Preferably block copolymers are use.

The phase separating thermoplastic polymer is preferably selected from poly sulphone; polyether sulphone; block copolymers comprising any combination of styrene, butadiene, acrylates, methacrylates, and acrylics; polyimide; polyetherimide; or any combination thereof.

Particularly preferred phase separating thermoplastic polymer resins are polyether sulphone; or block copolymers comprising any combination of styrene, butadiene, acrylates, methacrylates, and acrylics.

Block copolymers comprising styrene, butadiene, acrylates, methacrylates, or acrylics are to be understood as referring to polymers having two or more homopolymer subunits linked by covalent bonds, where at least one of said subunits is a styrene, butadiene, acrylate, methacrylate or acrylic homopolymer.

Suitable acrylate or methacrylate monomers for forming the block copolymer may be selected from any of the following, either alone or in any suitable combination: methyl methacrylate, methyl acrylate, ethyl acrylate, butyl acrylate, vinyl acrylate, acrylate, acrylonotrile, acrylamide, acrylic acid, and trimethylolpropane triacrylate (TMPTA).

The block copolymers comprising acrylates or methacrylate, may additionally comprise other homopolymer or individual monomer units. Suitable homopolymer or individual monomer units may be selected from any of the monomer or homopolymer thermoplastic polymers detailed herein. A further suitable additional unit which may be present in the form of a homopolymer or individual monomer unit are alkenes such as propene.

Suitable styrene monomers for forming the block copolymer may be selected from any of the following, either alone or in any suitable combination: styrene, methyl styrene, ethyl styrene, and t-butyl styrene.

Particularly preferred block copolymers comprising acrylates, methacrylates or acrylics include block copolymers of styrene-butadiene-methacrylate, and block copolymers of methylmethacrylate-butylacrylate-methyl methacrylate.

Suitable non acrylate/methacrylate/acrylic copolymers may include block copolymers of poly(ethylene oxide) (PEO) and poly(propylene oxide), for example poly(ethylene oxide)-block-poly(propylene oxide)-block-poly(ethylene oxide).

The molecular weight of the thermoplastic polymers forming the resin may be in the range from 10,000 to 200,000. Preferably, the molecular weight of the thermoplastic polymers forming the resin nay be in the range from 20,000 to 110,000.

It will be understood that the polymer molecular weights specified are weight average molecular weights. Weight average molecular weights are determined according to known formulas in the art and represented by $\overline{M}_\omega$.

The phase separating thermoplastic polymer resin may be present in the range 0.5 wt. % to 25 wt. % of the resin material. More preferably, the phase separating thermoplastic polymer may be present in the range 1 wt. % to 15 wt. %. Most preferably, the phase separating thermoplastic polymer may be present in the range 2 wt. % to 10 wt. %.

A fibrous reinforcement as may be added to allow for the formation of a composite material such as a prepreg. The fibrous material may be selected from hybrid or mixed fibre systems which comprise synthetic or natural fibres, or a combination thereof.

The fibrous reinforcement may preferably be selected from any suitable material such as carbon fibre, graphite fibre, metallized glass, fibre glass, aramid fibres (aromatic polyamide fibres), metallized carbon (e.g. nickel coated carbon fibre), metallized graphite, metallized polymer fibres (with continuous or discontinuous metal layers) where the polymer fibres may be soluble or insoluble in the resin material. Any combination of these fibres may be selected. Mixtures of these fibres with non-electrically conducting fibres (such as fibreglass for example) may be used.

The fibrous reinforcement may be fully or partially impregnated by the resin material. In an alternate embodiment, the resin material may be a separate layer which is proximal to, and in contact with, the fibrous reinforcement, but does not substantially impregnate said fibrous reinforcement.

The fibrous reinforcement is preferably formed substantially from carbon fibres.

The fibrous reinforcement may comprise cracked (i.e. stretch-broken), selectively discontinuous fibres, or continuous fibres. It is envisaged that use of cracked or selectively discontinuous fibres may facilitate lay-up of the composite material prior to being fully cured, and improve its capability of being shaped.

The fibrous reinforcement may be in a woven, non-crimped, non-woven, unidirectional, or multiaxial textile tapes or tows.

The woven form may be selected from a plain, satin, or twill weave style. The non-crimped and multiaxial forms may have a number of plies and fibre orientations.

Such styles and forms are well known in the composite reinforcement field, and are commercially available from a number of companies, including Hexcel Reinforcements of Les Avenieres, France.

The resin material may include at least one curing agent. Two or more curing agents may be used in combination.

For epoxy resins, the curing agents which may be selected are those which facilitate the curing of the epoxy-functional compounds, and in particular facilitate the ring opening polymerisation of such epoxy compounds. In a particularly preferred embodiment, such curing agents include those compounds which polymerize with the epoxy-functional compound or compounds during the ring opening polymerisation thereof.

The curing agent (s) is selected such that they provide curing of the resin material when combined therewith at suitable temperatures. The amount of curing agent required to provide adequate curing of the resin material will vary depending upon a number of factors including the type of resin being cured, the desired curing temperature and curing time. Typically curing agents typically include cyanoguanidine, aromatic and aliphatic amines, acid anhydrides, Lewis Acids, substituted ureas, imidazoles and hydrazines.

Further suitable curing agents may be selected from amines, including aromatic amines, or polyamino sulphones. Suitable specific curing agents which may be used include 1,3-diaminobenzene, 1,4-diaminobenzene, 4,4'-diaminodiphenylmethane, 4,4'-methylenebis(2,6-diethylaniline), 4,4'-methylenebis(2-methyl-6-isopropylaniline), 4,4'-methylenebis(3-chloro-2,6-diethylaniline) and the polyaminosulphones, such as 4,4'-diaminodiphenyl sulphone, 3,3'-diaminodiphenyl sulphone (3,3'-DDS), or any combination thereof.

Exemplary preferred curing agents include 4,4'-diaminodiphenyl sulphone (4,4'-DDS) and 3,3'-diaminodiphenyl sulphone (3,3'-DDS).

Suitable curing agents include anhydrides, particularly polycarboxylic anhydrides, such as nadic anhydride (NA), methylnadic anhydride, phthalic anhydride, tetrahydrophthalic anhydride, hexahydrophthalic anhydride, methyltetrahydrophthalic anhydride, methylhexahydrophthalic anhydride, endomethylenetetrahydrophthalic anhydride, or trimellitic anhydride.

The amount of curing agent, if present, may be determined on reference to known values which would be well known in the art of formulating resins and amines. Suitable ratios and quantities may be those described in Handbook of Epoxy Resins, by Henry L. Lee and Kris Neville (ISBN 0070369976) which is hereby incorporated by reference.

Accelerators, if present, typically include urones or imidazoles. Suitable accelerators, which may be used alone or in combination include N,N-dimethyl, N'-3,4-dichlorphenyl urea (Diuron), N'-3-chlorophenyl urea (Monuron), and preferably N,N-(4-methyl-m-phenylene bis[N',N'-dimethylurea]) (TDI urone).

The resin material and composite material may comprise non-carbon conductive additives. These non-carbon conductive additives may be present in addition to the carbon conductive additive material as described herein.

Suitable non-carbon conductive additives, by way of example, may include any of the following either alone or in combination: silver, gold, copper, aluminium, and nickel. Metal coated fillers may also be used, for example silver coated copper particles.

The non-carbon conductive additives may also comprise metal coated particles. The metal coated particles comprise a core material formed from any suitable material that is capable of being completely or partially coated with a metal.

Suitable core materials, by way of example, include any three dimensional bodies formed from polymer, rubber, ceramic, glass, carbon, metal, metal alloy, mineral, or refractory products such as fly ash.

The metal coating may be formed from metal or metal alloys may be of any suitable metal or metal alloys having high electrical conductivity. Suitable metal or metal alloys include, by way of example, silver, gold, nickel, copper, tin, aluminium, platinum, palladium, bronze, or brass.

The non-carbon conductive additives may also comprise intrinsically conductive polymer fibres (ICPs) selected from polyacetylene, polypyrrole, polythiophene, polyaniline, polyethylenedioxythiophene, and polyisothianaphthene.

It is envisaged that the carbon conductive additive material would provide sufficient electrical conductivity to the resin material or composite material for most applications. The non-carbon conductive additives may be present in order to further lower the surface resistivity and thereby increase the electrical conductivity.

An example of a suitable combination of carbon and non-carbon conductive additives would be a combination of ICPs with carbon black and graphite particles.

The resin material and the composite material of the present invention may also include additional ingredients such as performance enhancing or modifying agents. The performance enhancing or modifying agents, by way of example, may be selected from flexibilisers, toughening agents/particles, accelerators, core shell rubbers, flame retardants, wetting agents, pigments/dyes, flame retardants, plasticizers, UV absorbers, anti-fungal compounds, fillers, viscosity modifiers/flow control agents, tackifiers, stabilisers, and inhibitors.

Toughening agents/particles may include, by way of example, any of the following either alone or in combination: polyamides, copolyamides, polyimides, aramids, polyketones, polyetheretherketones, polyesters, polyurethanes, polysulphones, high performance hydrocarbon polymers, liquid crystal polymers, PTFE, elastomers, and segmented elastomers. Some of these toughening agents it will be noted are also useful as polymers of the invention.

Suitable fillers may include, by way of example, any of the following either alone or in combination: silicas, aluminas, titania, glass, calcium carbonate, and calcium oxide.

The resin material and the composite material of the present invention may comprise an additional polymer resin which may be any suitable thermoset or thermoplastic resin.

When in the resin material, the thermoplastic polymers self assemble to form a plurality of domains. These domains may each be in contact with other proximal domains, and may each have dimensions in the nanometer or micron range as defined herein. The carbon conductive additive material may aggregate in the thermoset polymer domains.

The block copolymer such as the poly(methylmethacrylate-b-butyl acrylate-b-methylmethacrylate) used in the present invention, 'self assembles' to form large domains which are incompatible with the thermoset polymer, and do not contain conductive carbon additives.

The conductive carbon is therefore found in the thermoset phase which forms a more conductive network than equivalent thermoset resins containing no block copolymer. In a thermoset resin that does not contain a block copolymer, the carbon additives are evenly distributed throughout the resin. It is this concept that has been used to improve the electrical conductivity of resin materials comprising carbon conductive additives.

The resulting cured resin material may typically have a surface resistivity level in the range from $1\times10^{-3}$ to $1\times10^{6}$ Ohms/square. The surface resistivity will vary, of course, depending upon the specific carbon conductive additive material present, and the amounts used.

Without wishing to be unduly bound by theory, it has been found that the benefits of the invention may be conferred due to the thermoplastic polymer producing domains to which the carbon conductive particles associate with. This formation of domains is believed to provide a more structured morphology for the resin material and therefore provides enhanced electrical conductivity.

The resin material may be applied to the fibrous reinforcement. It is understood that references to a composite material include materials which comprise a fibre reinforcement, where the resin material is in contact with the fibre but not impregnated in the fibre. The term composite material also includes an alternative arrangement in which the resin material is partially embedded or partially impregnated in the fibre, commonly known in the art as prepreg.

The composite material formed may be in the form of continuous tapes, towpregs, webs, or chopped lengths (chopping and slitting operations may be carried out at any point after impregnation). The composite material may be an adhesive or surfacing film and may additionally have embedded carriers in various forms both woven, knitted, and non-woven. The composite material may be fully or only partially impregnated, for example, to facilitate air removal during curing.

The mixed resin material containing all the necessary additives and the conductive particles can be incorporated into prepreg by any of the known methods, for example a so-called lacquer process, resin film process, extrusion, spraying, printing or other methods known.

In a lacquer process all the resin components are dissolved or dispersed in a solvent and the fibrous reinforcement is dipped in the solvent, and the solvent is then removed by heat. In a resin film process the resin material is cast as a continuous film, either from a lacquer or a hot melt resin, onto a substrate which has been treated with a release agent, and then the coated film is contacted against the fibrous reinforcement and, under the aid of heat and pressure, the resin film melts and flows into the fibres. A multiplicity of films may be used and one or both sides of the fibre layer may be impregnated in this way.

If the prepreg is made by a film or lacquer process, the majority of the conductive particles will be "filtered" by the reinforcing fibres and thus will be substantially prevented from entering the fibrous reinforcement because the particle size is larger than the distance between the reinforcing fibres. Other processes such as spraying or printing may enable the carbon conductive additives to be placed directly onto the fibrous reinforcement with very low penetration of the said particles between the fibres. The choice of process will depend upon the specific type and size of carbon conductive additives used.

The composite material of the invention may be fully or partially cured using any suitable temperature, pressure, and time conditions known in the art.

The composite material may be cured using a method selected from UV-visible radiation, microwave radiation, electron beam, gamma radiation, or other suitable thermal or non-thermal radiation.

Thus, according to a fourth aspect of the present invention there is provided a cured composite material which is formed by curing the composite material of the third aspect.

It is envisaged that the resin material of the first aspect may also be used without the addition of fibrous reinforcement.

The resin material of the present invention may be fully or partially cured using any suitable temperature, pressure, and time conditions.

The resin material may be cured using a method selected from UV-visible radiation, microwave radiation, electron beam, gamma radiation, or other suitable thermal or non-thermal radiation.

Thus, according to a fifth aspect of the present invention there is provided a cured resin material which is formed by curing the resin material of the first aspect.

The improved resin materials and composite materials of the present invention will find application in making articles such as numerous primary and secondary aerospace structures (wings, fuselage, bulkhead etc.), but will also be useful in many other high performance composite applications including automotive, rail and marine applications where good electrical conductivity is required in combination with low material weight.

The level of conductivity achieved by the present invention will make the resulting composite materials suitable for use in electromagnetic shielding, electrostatic protection, current return, and other applications where enhanced electrical conductivity is necessary.

The combination of carbon conductive particles with a thermoset and thermoplastic polymer therefore provide the benefits of lower surface resistivity and improved electrical conductance, and provide a resin with low viscosity and good mechanical properties. The resin material provides the benefits of the invention either in a resin form or when combined with fibrous reinforcement in a composite material.

In addition to the first aspect of the present invention as detailed herein, there is also provided an embodiment in which the resin material may be alternatively defined.

Thus according to a sixth aspect of the present invention there is provided a resin material comprising;
- at least one thermoset polymer resin present in an amount in the range 0.5 wt. % to 99.4 wt. %;
- carbon conductive additive material present in an amount in the range 0.1 wt. % to 20 wt. %; and
- at least one thermoplastic polymer resin present in an amount in the range 0.5 wt. % to 25 wt. % and selected from polysulphone; polyether sulphone; block copolymers comprising any combination of styrene, butadiene, acrylates, methacrylates, and acrylics; polyimide; polyetherimide; block copolymers of poly(ethylene oxide) and poly(propylene oxide); or any combination thereof.

All of the features described herein may be combined with any of the above aspects, in any combination.

In order that the present invention may be more readily understood, reference will now be made, by way of example, to the following description and accompanying drawings.

Figure 1:
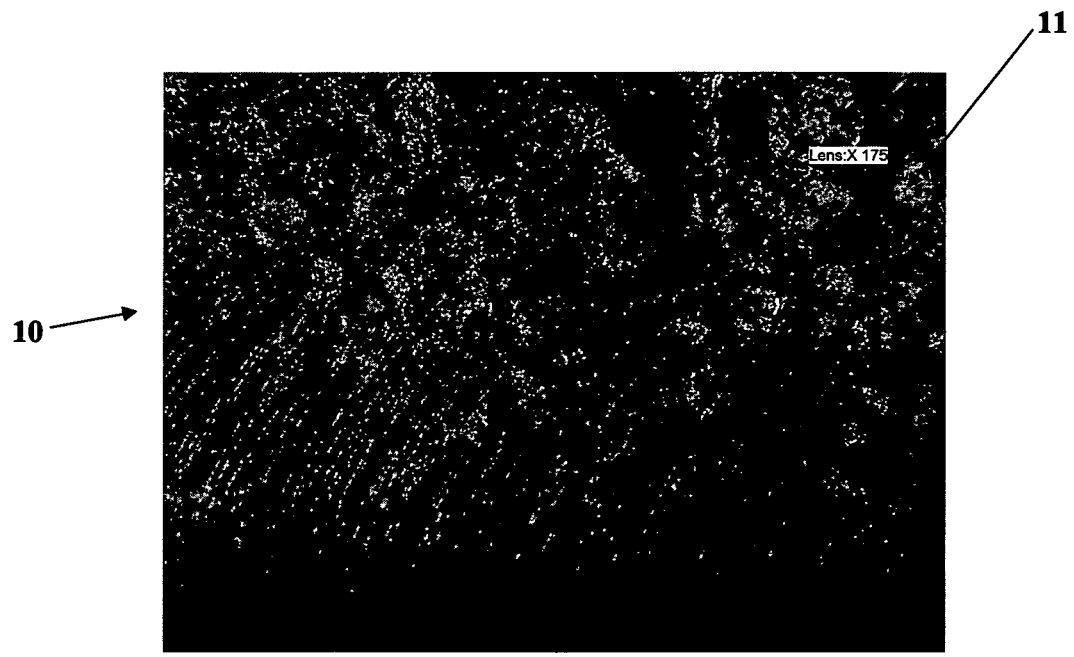
FIG. 1 is a micrograph of a cross-section of a cured resin.

It will be understood that all tests and physical properties listed have been determined at atmospheric pressure and room temperature (i.e. 20° C.), unless otherwise stated herein, or unless otherwise stated in the referenced test methods and procedures.

In the following examples the term "neat resin" refers to the resin material in the absence of reinforcing fibres. The neat resin is typically the resin used for subsequent manufacture of a composite material (prepreg).

Thermosetting Resin With CNF

REFERENCE EXAMPLE

Example 1

To bisphenol F resin (40.00 g) was added carbon nanofibres (1.41 g, 2.5 wt. %) of diameter 150 nm obtained from Electrovac of Klosterneuburg, Austria; The carbon nanofibres were dispersed using a Flaktec speedmixer (10 min at 3000 rpm). The curing agent 4,4'-diaminodiphenylsulphone (15.03 g) was added, and the mixture was cured in a large shallow aluminium dish at 180° C. for 2 hours.

Surface resistivity was measured for the cured plaque using a model 272 resistivity meter from Monroe Electronics. A circular electrode was placed on the surface of the neat resin specimen and a reading was measured and displayed on the instrument panel. In order to ensure good contact between the specimen and the probe the cured resin sample was flat, smooth, and uniform. Surface resistivity of the cured resin was determined to be $1.0 \times 10^5$ Ohms per square.

Referring to FIG. 1 there is shown a micrograph of a cross-section of the cured epoxy resin 10 of Example 1. The micrograph shows that the CNF are distributed throughout the cured matrix with evidence of some CNF agglomeratation 11. The micrograph also shows that there are no thermoplastics in the lighter areas of the scan. The cured epoxy resin does not show the domain formation which is apparent in micrographs of the present invention, and as such does not provide low resistivity and, in turn, good electrical conductivity.

Comparison of Differing Amounts of Block Copolymer with CNF

Example 2(a)

To a bisphenol F resin (40.00 g) was added a block copolymer (2.90 g, 5.0 wt. %). The block copolymer comprising polymethyl methacrylate-block-polybutyl acrylate-block-polymethyl methacrylate (MAM) and having a molecular weight of around 40,000 available from Arkema of Lacq, France as M22. This mixture was heated and stirred at 120° C. for approximately 1 hour until the block copolymer had dissolved in the bisphenol F. The mixture was allowed to cool to room temperature, and carbon nanofibres (150 nm) were then added (1.41 g, 2.5 wt. %). The mixture was blended using a speedmixer (10 min at 3000 rpm). The curing agent of 4,4'-diaminodiphenylsulphone (15.03 g) was added, and the mixture cured at 180° C. for 2 hours.

Example 2(b)

The method of Example 2(a) was repeated using block copolymer at 10 wt. % rather than 5 wt. %.

Surface resistivity of the resin materials of Examples 2(a) & (b) was measured using the same method and resistivity meter from Monroe Electronics as described in Example 1. Results are shown in Table 1. These results show that the addition of the M22 block copolymer to the CNF containing matrix has reduced the electrical resistivity of the sample even though the copolymer is an insulator.

TABLE 1

| Surface resistivity of epoxy resin formulation containing a methacrylate block copolymer and CNF (150 nm) | | |
|---|---|---|
| Example | Block Copolymer (wt. %) | Surface Resistivity (Ohms/square) |
| 1 | 0 | $1.0 \times 10^5$ |
| 2(a) | 5.0 | $1.0 \times 10^3$ |
| 2(b) | 10.0 | $9.3 \times 10^2$ |

The result of Table 1 show that low amounts of CNF used in a mixture of block copolymer and bisphenol F provide for reduced surface resistivity and therefore improved electrical conductivity when compared to a cured resin having CNF and epoxy resin alone as seen in Example 1.

Higher amounts of the block copolymer lead to a decrease in surface resistivity and therefore an increase conductivity.

Figure 2:
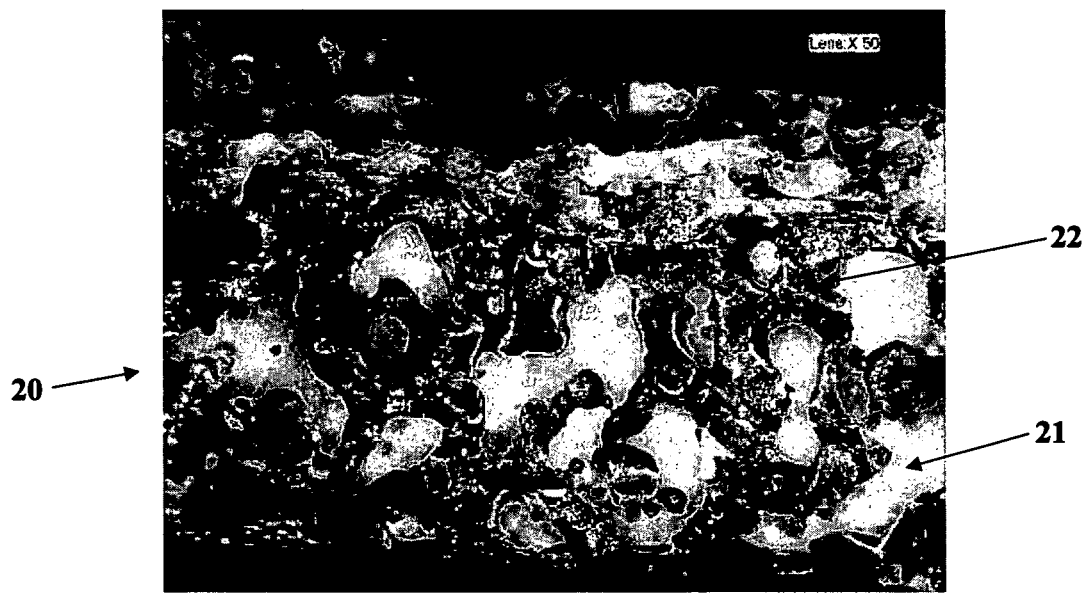
FIG. 2 is a micrograph of a cross-section of a cured resin of the present invention.

Referring to FIG. 2, there is shown a micrograph of a cross-section of the cured resin 20 of Example 2(a). The cured resin 20 comprises both an epoxy phase 22 CNF (150 nm) and the block copolymer MAM 21. The insulating MAM 22 separated from the epoxy resin during cure. The CNF are predominantly present in the epoxy phase 22 rather than the MAM phase 21. The CNF have therefore become more concentrated in the epoxy phase 22 and formed a connective network which is electrically conductive.

Comparison of Differing Amounts of Block Copolymer with CNF

Example 3(a)

To a bisphenol F resin (40.00 g) was added a block copolymer based on methyl methacrylate and butyl acrylate (2.90 g, 5.0 wt. %) known as M22D and obtained from Arkema. This mixture was heated and stirred at 120° C. approximately 1 hour until the block copolymer had dissolved in the bisphenol F. The mixture was allowed to cool to room temperature and carbon nanofibres (150 nm) were then added (1.41 g, 2 wt. %). The mixture was blended using a speedmixer (10 min at 3000 rpm). The curing agent 4,4'-diaminodiphenylsulphone (15.03 g) was added, and the mixture cured at 180° C. for 2 hours.

Example 3(b)

The method of Example 3(a) was repeated using block copolymer at 10 wt. % rather than 5 wt. %.

Surface resistivity of the resin materials of Examples 3(a) & (b) was measured using the same method and resistivity meter as described in Example 1. The results are shown in Table 2.

TABLE 2

Surface resistivity of epoxy resin formulation containing a methacrylate block copolymer and CNF (150 nm)

| Example | Block Copolymer (wt. %) | Surface Resistivity (Ohms/square) |
|---|---|---|
| 1 | 0 | $1.0 \times 10^5$ |
| 3(a) | 5.0 | $4.5 \times 10^3$ |
| 3(b) | 10.0 | $2.1 \times 10^3$ |

The results in Table 2 further show that low amounts of CNF used in a mixture of block copolymer and bisphenol F provide for reduced surface resistivity and therefore improved electrical conductivity when compared to a cured resin having CNF and epoxy resin alone as seen in Example 1.

Comparison of Differing Amounts of Block Copolymer with CNF (110 nm)

Example 4(a)

To a bisphenol F resin (40.00 g) was added a block copolymer based on polymethyl methacrylate-block-polybutyl acrylate-block-polymethyl methacrylate (MAM) known as M22 from Arkema (2.90 g, 5.0 wt. %). This mixture was heated and stirred at 120° C. for approximately 1 hour until the block copolymer had dissolved in the resin. The mixture was allowed to cool to room temperature and carbon nanofibres (110 nm) were then added (1.41 g, 2.5 wt. %). The mixture was blended using a speedmixer (10 min at 3000 rpm). The curing agent 4,4'-diaminodiphenylsulphone (15.03 g) was added, and the mixture cured at 180° C. for 2 hours.

Example 4(b)

The method of Example 4(a) was repeated using block copolymer at 10 wt. % rather than 5 wt. %.

Example 1 (110 nm)

Example 1 (110 nm) is a reference example which comprises the same materials and is made by the same method as described for Example 1, with the only difference being that carbon nanofibres of diameter 110 nm are used instead of 150 nm.

Surface resistivity of the resin materials of Examples 4(a) & (b) was measured using the same method and resistivity meter as described in Example 1. The results are shown in Table 3.

TABLE 3

Surface resistivity of epoxy resin formulation containing a methacrylate block copolymer and CNF (110 nm)

| Example | Block Copolymer (wt. %) | Surface Resistivity (Ohms/square) |
|---|---|---|
| 1 (110 nm) | 0 | 320 |
| 4(a) | 5.0 | 200 |
| 4(b) | 10.0 | 123 |

The results in Table 3 show that the use of increasing amounts of CNF having diameter 110 nm provides for a reduction in surface resistivity of the resin material, and therefore a resulting increase in electrical conductivity.

Comparison of Differing Amounts of Block Copolymer with CNF

Example 5

To a bisphenol F resin (40.00 g) was added a block copolymer based on methyl methacrylate and butyl acrylate known as M52 from Arkema and having a molecular weight of around 90,000 (2.90 g, 5.0 wt. %). This mixture was heated and stirred at 120° C. for approximately 1 hour until the block copolymer had dissolved in the bisphenol F. The mixture was allowed to cool to room temperature and carbon nanofibres (100 nm) were then added (1.41 g, 2.5 wt. %). The mixture was blended using a speedmixer (10 min at 3000 rpm). The curing agent 4,4'-diaminodiphenylsulphone (15.03 g) was added and mixed, and the mixture cured at 180° C. for 2 hours.

Example 1 (100 nm)

Example 1 (100 nm) is a reference example which comprises the same materials and is made by the same method as described in Example 1, with the only difference being that carbon nanofibres of diameter 100 nm ae used instead of 150 nm.

Surface resistivity was measured using the same method and resistivity meter as described in Example 1. The results are shown in Table 4.

TABLE 4

Surface resistivity of epoxy resin formulation containing a methacrylate block copolymer and 100 nm CNFs

| Example | Block Copolymer (wt. %) | Surface Resistivity (Ohms/square) |
|---|---|---|
| 1 (100 nm) | 0 | $5.2 \times 10^7$ |
| 5 | 5.0 | $1.8 \times 10^6$ |

The presence of the MAM block copolymer in Example 5 provides a reduced the surface resistivity of the resin material in comparison to reference Example 1 (100 nm). This is surprising as MAM block copolymer is typically seen as electrically insulating, and therefore the addition of this block copolymer to an epoxy resin/CNF material would have been thought to reduce electrical conductivity rather than improve it.

Figure 3:
FIG. 3 is a micrograph of a cross-section of a further cured resin of the present invention.

Referring to FIG. 3, there is shown a micrograph of a cross-section 30 of the cured resin of Example 5. The insulating MAM 31 has separated from the epoxy resin 32 during cure. The CNF are predominantly present in the MAM phase 31. The CNF have therefore become more concentrated in the epoxy phase 32 and formed a connective network which is electrically conductive.

Comparison of Differing Amounts of Polyethersulphone (PES) with CNF

Example 6(a)

To a bisphenol F resin (40.00 g) was added PES (2.90 g, 5.0 wt. %). This mixture was heated and stirred at 145° C. for approximately 1 hour until the PES had dissolved in the bisphenol F. The mixture was allowed to cool to room temperature and carbon nanofibres (150 nm) were added (1.41 g, 2.5 wt. %). The mixture was blended using a speedmixer (10 min at 3000 rpm). The curing agent 4,4'-diaminodiphenylsulphone (15.03 g) was added and mixed in. The mixture was cured at 180° C. for 2 hours.

Example 6(b)

The method of Example 6(a) was repeated using block copolymer at 10 wt. % rather than 5 wt. %.

Surface resistivity of the resin materials of Examples 6(a) & (b) was measured using the same method and resistivity meter as described in Example 1. The results are shown in Table 5.

TABLE 5

Surface resistivity of epoxy resin formulation containing PES and CNF

| Example | PES (wt. %) | Surface Resistivity (Ohms/square) |
|---------|-------------|-----------------------------------|
| 1       | 0           | $1.0 \times 10^5$                 |
| 6(a)    | 5.0         | $5.5 \times 10^3$                 |
| 6(b)    | 10.0        | $5.0 \times 10^3$                 |

The presence of PES, like the block copolymers of Examples 2-5, also provides a reduction in surface resistivity at low loading in comparison to cured resin having CNF and epoxy resin only as shown in Reference Example 1. The resulting resin having a lower surface resistivity would therefore have an increased electrical conductivity.

It is to be understood that the invention is not to be limited to the details of the above embodiments, which are described by way of example only. Many variations are possible.

The invention claimed is:

1. A cured resin material comprising:
   a non-thermoplastic polymer phase comprising cured epoxy resin;
   phase separated domains located within said non-thermoplastic polymer phase, said phase separated domains comprising thermoplastic polymer and having a size in the range of 20 to 5000 nanometers; and
   carbon conductive additive material comprising carbon nanofibres having a diameter of from 110 nanometers to 150 nanometers wherein said carbon conductive additive material is located only in said non-thermoplastic polymer phase so as to form an electrically conductive connective network therein.

2. A cured resin material according to claim 1 wherein the carbon nanofibres have a length in the range of 1 μm to 10 μm.

3. A cured resin material according to claim 1 wherein the amount of carbon conductive additive material in said cured resin material is in the range of 1 wt. % to 5 wt. % of the total weight of said cured resin material.

4. A cured resin material according to claim 1 wherein said thermoplastic polymer is selected from the group consisting of polyethersulfone or block copolymers comprising any combination of styrene, butadiene, acrylates, methacrylates and acrylics.

5. A cured resin material according to claim 4 wherein said block copolymers comprise block copolymers of styrene-butadiene-methacrylate or block copolymers of methyl methacrylate-butylacrylate-methyl methacrylate.

6. A cured resin material according to claim 4 wherein said block copolymers comprise block copolymers of poly(ethylene oxide) and poly(propylene oxide).

7. A cured resin material according to claim 4 wherein said thermoplastic polymer is polyether sulfone.

8. A cured resin material according to claim 1 wherein the amount of said thermoplastic polymer is in the range of 2 wt. % to 10 wt. % of the total weight of the cured resin material.

9. A composite material, said composite material comprising a cured resin material according to claim 1 and a fibrous reinforcement.

10. A composite material, said composite material comprising a cured resin material according to claim 2 and a fibrous reinforcement.

11. A composite material, said composite material comprising a cured resin material according to claim 3 and a fibrous reinforcement.

12. A composite material, said composite material comprising a cured resin material according to claim 4 and a fibrous reinforcement.

13. A composite material, said composite material comprising a cured resin material according to claim 5 and a fibrous reinforcement.

14. A composite material, said composite material comprising a cured resin material according to claim 6 and a fibrous reinforcement.

15. A composite material, said composite material comprising a cured resin material according to claim 7 and a fibrous reinforcement.

16. A composite material, said composite material comprising a cured resin material according to claim 8 and a fibrous reinforcement.

* * * * *